(12) United States Patent
Stranges

(10) Patent No.: US 7,637,337 B2
(45) Date of Patent: Dec. 29, 2009

(54) TRANSMISSION OIL PAN

(75) Inventor: Antonio Stranges, Livonia, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 286 days.

(21) Appl. No.: 11/788,309

(22) Filed: Apr. 19, 2007

(65) Prior Publication Data

US 2008/0257625 A1 Oct. 23, 2008

(51) Int. Cl.
*F16N 7/00* (2006.01)
(52) U.S. Cl. .................... 180/69.1; 184/106
(58) Field of Classification Search ............ 180/69.1; 184/106
See application file for complete search history.

(56) References Cited

U.S. PATENT DOCUMENTS

| | | | | |
|---|---|---|---|---|
| 2,577,188 A | * | 12/1951 | Hall | 184/106 |
| 3,333,652 A | * | 8/1967 | Tribuzi | 180/69.1 |
| 3,980,153 A | * | 9/1976 | Andrews | 180/69.1 |
| 4,068,646 A | * | 1/1978 | Hnojsky | 123/195 C |
| 4,114,717 A | * | 9/1978 | Andrews | 180/69.1 |
| 4,296,716 A | * | 10/1981 | Hofbauer et al. | 123/195 C |
| 4,577,713 A | * | 3/1986 | Moon | 180/69.1 |
| 5,103,782 A | * | 4/1992 | Matsui | 123/195 C |
| 5,937,817 A | * | 8/1999 | Schanz et al. | 123/196 AB |
| 6,058,898 A | * | 5/2000 | Freese, V | 123/195 C |
| 6,217,758 B1 | * | 4/2001 | Lee | 210/167.06 |
| 6,340,012 B1 | * | 1/2002 | Yamashita et al. | 123/195 C |
| 6,378,639 B1 | * | 4/2002 | Murray | 180/69.1 |
| 6,488,844 B2 | * | 12/2002 | Willis et al. | 210/172.2 |
| 7,322,335 B2 | * | 1/2008 | Suzuki et al. | 123/195 C |
| 7,387,190 B2 | * | 6/2008 | Lochocki, Jr. | 184/106 |
| 7,444,729 B2 | * | 11/2008 | Lochocki | 29/407.01 |
| 2004/0177827 A1 | * | 9/2004 | Hoyte et al. | 123/196 AB |
| 2008/0066982 A1 | * | 3/2008 | Kobayashi et al. | 180/69.1 |
| 2008/0083586 A1 | * | 4/2008 | Kobayashi et al. | 184/6.4 |
| 2008/0257625 A1 | * | 10/2008 | Stranges | 180/69.1 |
| 2008/0314572 A1 | * | 12/2008 | Hommes | 165/166 |
| 2009/0107769 A1 | * | 4/2009 | Sato et al. | 184/6.2 |

* cited by examiner

*Primary Examiner*—Jeffrey J Restifo
(74) *Attorney, Agent, or Firm*—David B. Kelley; MacMillan, Sobanski & Todd, LLC

(57) ABSTRACT

An oil pan includes a chamber for containing a liquid, a first passage for containing a coolant and forming a first flow path along a length of the chamber, including a first surface located between the chamber and the first passage, and a second passage for containing the liquid coolant, communicating with the first passage and forming a second flow path along a length of the chamber, including a second surface located between the chamber and the second first passage.

10 Claims, 2 Drawing Sheets

TRANSMISSION OIL PAN

BACKGROUND OF THE INVENTION

1. Field of the Invention

This invention relates generally to cooling transmission fluid, and, more particularly, to an automatic transmission oil pan having an oil-to-coolant heat exchanger.

2. Description of the Prior Art

Automatic transmission fluid (ATF) circulates continually through the transmission lubricating and cooling components that rotate at relatively high speed within a transmission case. The ATF, which is drawn by a pump from a transmission sump or oil pan located below, and secured to the transmission case, returns to the oil pan by gravity feed after circulating through the transmission. Its temperature increases in this flow path and must be lowered by passing through an oil cooler, which is usually located behind a radiator, in which heat from the engine coolant is transferred to an air stream flowing through the radiator. The system that supports this heat exchange consumes packaging space, is inefficient, costly, and cumbersome to assemble and service.

There is a need in the industry for a system and method for integrating an oil-to-coolant heat exchanger/cooler in a transmission oil pan. Heat transferred from the ATF to the coolant could be transported from the transmission to the radiator, where heat from the engine coolant is transferred to the airstream that flow through the radiator.

SUMMARY OF THE INVENTION

An oil pan includes a chamber for containing a liquid, a first passage for containing a coolant and forming a first flow path along a length of the chamber, including a first surface located between the chamber and the first passage, and a second passage for containing the liquid coolant, communicating with the first passage and forming a second flow path along a length of the chamber, including a second surface located between the chamber and the second first passage.

Coolant is supplied to the transmission oil pan instead of sending ATF to a cooler at the front of the vehicle, thereby producing important advantages. ATF never leaves the transmission; therefore, oil leaks related to the cooling system and loss of transmission function due to inadequate ATF level are unlikely. In addition, the transmission operates more efficiently because its pump is not burdened with flow restrictions in cooler lines and the cooler.

Eliminating the oil-to-air cooler reduces system cost, results in the deletion of the cooler by-pass valve, which also reduces cost and system complexity, and improves air flow through the engine cooler & radiator at front of vehicle.

Tubes needed to run coolant to the transmission cost less that tubes required to run ATF to the front of vehicle.

Fewer hydraulic connections are required between the engine & transmission cooling systems, thereby reducing cost and improving ease of assembly. Overall vehicle packaging space is improved, except for a deeper transmission oil pan.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
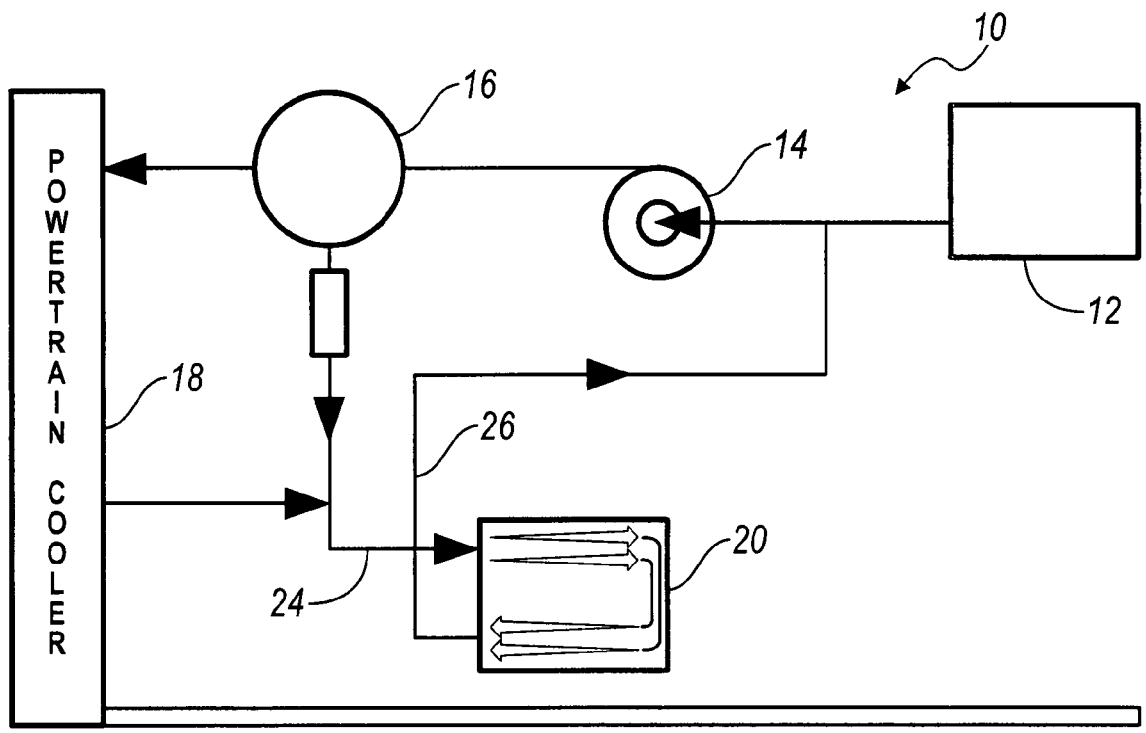
FIG. 1 is a schematic diagram of a powertrain cooling system.

Referring first to FIG. 1, a cooling system for a vehicle powertrain 10 includes a coolant reservoir 12, a hydraulic pump, thermostat 16, cooler 18, and transmission oil pan 20 with integrated cooling. Engine coolant is drawn by pump 14 from reservoir 12, such as the water jacket of an engine block, and is supplied through thermostat 16 to cooler 18, where heat is exchanged from the coolant to an air stream flowing through cooler 18. Low temperature coolant exiting cooler 18 flows through oil pan 20, where heat is exchanged from transmission oil located in the oil pan 20 to the coolant. Upon exiting the oil pan 10, the coolant returns to pump 14, and is recirculated through the system 10.

Figure 2:
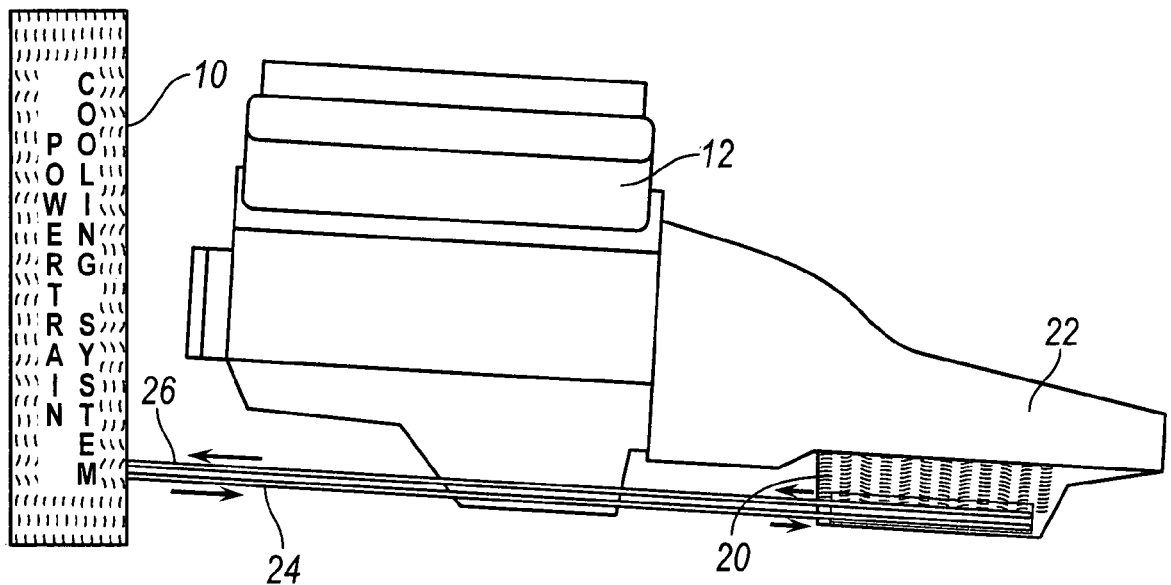
FIG. 2 is a schematic diagram of showing a transmission oil pan secured to a transmission case.

FIG. 2 shows the engine block 12, the oil pan 20 secured to the bottom of a transmission case 22, an inlet line 24 that carries coolant from cooler 18 to the oil pan, and an outlet line 26 that returns coolant from the oil pan to the cooling system 10.

Figure 3:
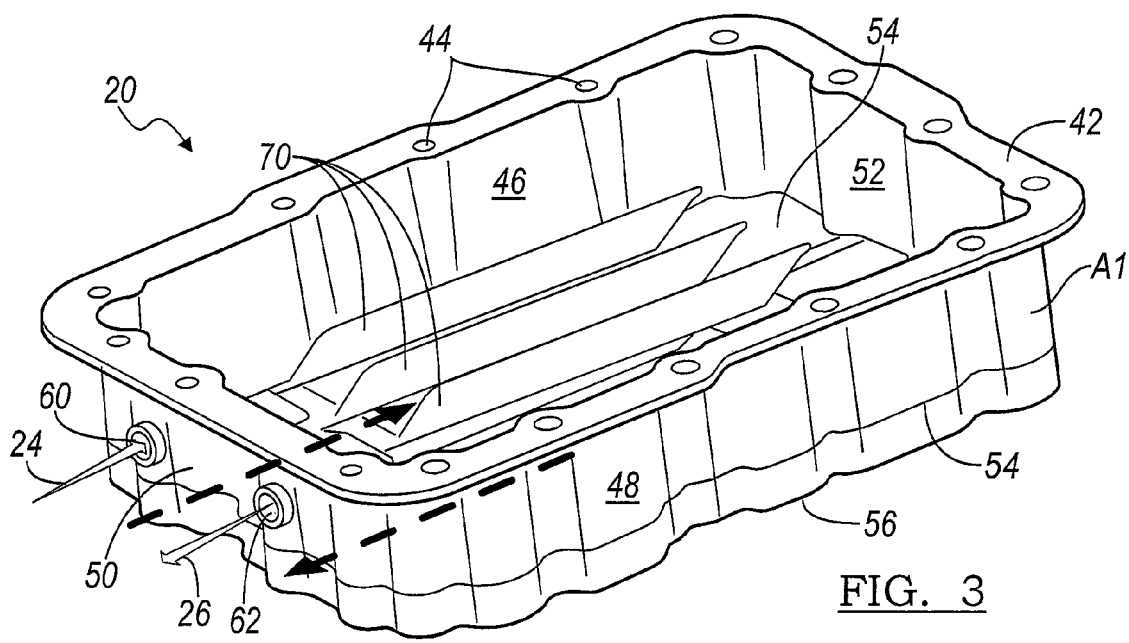
FIG. 3 is an isometric view of a transmission oil pan in which heat transfer passages are located at the bottom of the pan of shown in FIG. 2.
Figure 4:
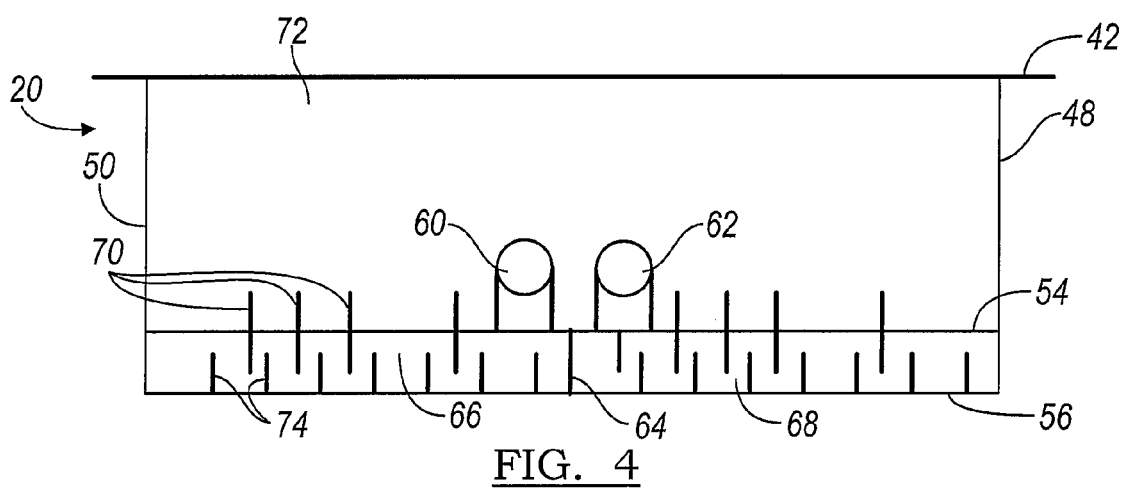
FIG. 4 is schematic diagram of the oil pan shown in FIG. 3.

Referring to FIGS. 3 and 4, oil pan 20 is a container having an upper flange 42 extending around its periphery and formed with a series of holes 44 for bolts, which secured the pan to a transmission case, side walls 46, 48 extending along the length of the pan, end walls 50, 52 extending along the width of the pan, a lower surface 54, and a bottom surface 56, spaced from the lower surface.

One of the end walls 50 is formed with an inlet 60 connected to inlet line 24, and an outlet 62 connected to outlet line 26. The space below lower surface 54 and above bottom surface 56 is divided by a bulkhead 64 into a first passage 66 and a second passage 68.

The lower surface 54 is formed with fins 70, which extend above surface 54 into the chamber 72 that contain transmission oil, and below surface 54 into passages 66 and 68. Similarly, the bottom surface 56 is formed with fins 74, which extend above surface 56 into passages 66 and 68. Fins 70, 72 are secured to surfaces 54 and 56 preferably by soldering or welding, and the fins are of aluminum or copper, or another material having a relatively high coefficient of thermal conduction.

In operation, coolant entering inlet 60 flows downward into passage 66, along the length of oil pan 20, around a space between bulkhead 64 and end wall 52, into passage 68, and along the length of the oil pan to outlet 62, from which it exits the oil pan. While traversing this flow path, heat from the oil in chamber 72 is transmitted through the fins 70, 74 to the coolant, which is returned to the system 10 wherein heat in the coolant is transferred to the air stream that flows through the cooler 18.

When atmospheric air temperature is low, such as during winter operation, hot coolant can be sent to the heat exchanger in the oil pan 20 to heat transmission oil in the pan 20 to an optimal operating temperature, thereby improving the quality of gear shifts produced by the transmission and fuel economy.

Figure 5:
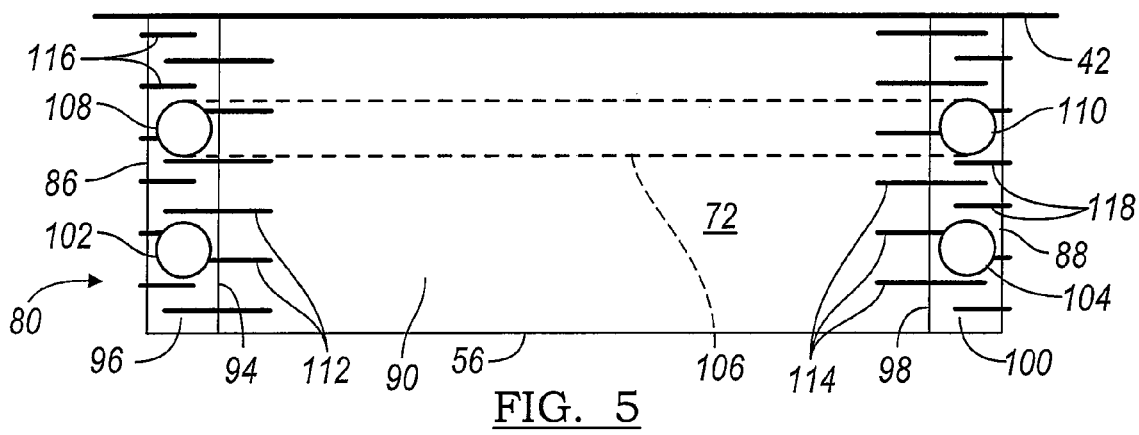
FIG. 5 is a schematic diagram of an oil pan in which heat transfer passages are located at opposite the sides of the pan.

FIG. 5 illustrates a second embodiment of an oil pan 80, which includes the upper flange 42, bolt holes 44, side walls 86, 88 extending along the length of the pan, end walls 90, 92 extending along the width of the pan, and a bottom surface 56. A first bulkhead 94, spaced laterally from side wall 86, forms a first passage 96 in a space bounded by bottom surface 56, bulkhead 94, and side wall 86. A second bulkhead 98, spaced laterally from side wall 88, forms a second passage 100 in a space bounded by bottom surface 56, bulkhead 98, and side wall 88.

One of the end walls 90 is formed with an inlet 102 connected to inlet line 24, and an outlet 104 connected to outlet line 26. Passages 96 and 100 are hydraulically connected by a coolant line 106, located outside end wall 92 and extending along the length of wall 92, i.e., across width of the pan 80. Line 106 communicates with passage 96 through a port 108 and with passage 100 through a port 110. Ports 108 and 110 are formed through the end wall 92.

Bulkhead 94 is formed with fins 112, which extend into the chamber 72 that contain transmission oil, and into passage 96. Similarly, bulkhead 98 is formed with fins 114, which extend into the chamber 72 that contain transmission oil, and into passage 100. End wall 86 is formed with fins 116, which extend into passage 96. Similarly, end wall 88 is formed with fins 118, which extend into passage 100.

In operation, coolant entering inlet 102 flows in passage 96 along the length of oil pan 80, exits passage 96 through port 108, flows through line 106, enters passage 100 through port 110, flows in passage 100 along the along the length of the oil pan 80 to outlet 104, from which it exits the oil pan. While traversing this flow path, heat from the oil in chamber 72 is transmitted through the fins to the coolant, which is returned to the system 10 wherein heat in the coolant is transferred to the air stream that flows through the cooler 18.

In accordance with the provisions of the patent statutes, the preferred embodiment has been described. However, it should be noted that the alternate embodiments can be practiced otherwise than as specifically illustrated and described.

What is claimed is:

1. An oil pan comprising:
a chamber for containing a first liquid;
an inlet and an outlet;
a first passage along which a second liquid flows from the inlet in a first direction, and including a first surface that prevents communication between the chamber and the first passage;
a second passage communicating with the first passage and along which the second liquid flows toward the outlet in a second direction opposite the first direction, including a second surface that prevents communication between the chamber and the second passage, and a bulkhead that prevents fluid flow therepast between the first passage and the second passage.

2. The oil pan of claim 1, further comprising:
a mounting surface for securing the oil pan to a case, from which the first liquid enters the chamber.

3. The oil pan of claim 1, further comprising:
first and second end walls; and
first and second side walls connected to the end walls, the end walls, the side walls, the first surface and the second surface forming a boundary around the chamber; and
wherein the second liquid enters the first passage through the inlet, and the second liquid exits the second passage through the outlet.

4. The oil pan of claim 1, further comprising:
first fins secured to the first surface and extending into the chamber and the first passage;
second fins secured to the second surface and extending into the chamber and the second passage.

5. The oil pan of claim 1, further comprising:
first fins secured to the first surface and extending into the chamber; and
second fins secured to the second surface and extending into the chamber.

6. An oil pan comprising:
a bottom surface;
a chamber for containing a first liquid, including a lower surface spaced from the bottom surface;
a first passage along which a second liquid flows in a first direction, the lower surface preventing communication between the chamber and the first passage; and
a second passage communicating with the first passage and along which the second liquid flows in a second direction opposite the first direction, the lower surface preventing communication between the chamber and the second passage, and a bulkhead that prevents fluid flow therepast between the first passage and the second passage.

7. The oil pan of claim 6, further comprising:
the bulkhead extends between the bottom surface and the lower surface, and along a length of the chamber, separating the first passage from the second passage.

8. The oil pan of claim 6, further comprising:
an inlet through which the second liquid enters the first passage, and an outlet through which the second liquid exits the second passage;
first and second end walls; and
first and second side walls connected to the end walls, the end walls, the side walls, and the lower surface forming a boundary around the chamber.

9. The oil pan of claim 6, further comprising:
first fins secured to the lower surface and extending into the chamber and the first passage;
second fins secured to the lower surface and extending into the chamber and the second passage.

10. The oil pan of claim 6, further comprising:
first fins secured to the first surface and extending into the chamber; and
second fins secured to the second surface and extending into the chamber.

* * * * *